(12) United States Patent
Sarakas

(10) Patent No.: US 8,996,586 B2
(45) Date of Patent: Mar. 31, 2015

(54) VIRTUAL STORAGE OF PORTABLE MEDIA FILES

(75) Inventor: Stephen T. Sarakas, St. Peters, MO (US)

(73) Assignee: Callplex, Inc., St. Peters, MO (US)

( * ) Notice: Subject to any disclaimer, the term of this patent is extended or adjusted under 35 U.S.C. 154(b) by 712 days.

(21) Appl. No.: 11/675,367

(22) Filed: Feb. 15, 2007

(65) Prior Publication Data

US 2007/0198463 A1 Aug. 23, 2007

(51) Int. Cl.
 G06F 7/00 (2006.01)
 G06F 17/30 (2006.01)

(52) U.S. Cl.
 CPC ................................ *G06F 17/30233* (2013.01)
 USPC ........................................................ 707/802

(58) Field of Classification Search
 USPC .......... 707/101, 104.1, 10, 999.101, 999.102, 707/802
 See application file for complete search history.

(56) References Cited

U.S. PATENT DOCUMENTS

| | | | |
|---|---|---|---|
| 5,014,197 A * | 5/1991 | Wolf | 710/38 |
| 5,191,611 A | 3/1993 | Lang | |
| 5,485,474 A | 1/1996 | Rabin | |
| 5,544,320 A | 8/1996 | Konrad | |
| 5,625,692 A | 4/1997 | Herzberg et al. | |
| 5,647,000 A | 7/1997 | Leighton | |
| 5,696,901 A | 12/1997 | Konrad | |
| 5,708,714 A | 1/1998 | Lopez et al. | |
| 5,734,892 A | 3/1998 | Chu | |
| 5,761,667 A * | 6/1998 | Koeppen | 1/1 |
| 5,764,767 A | 6/1998 | Beimel et al. | |
| 5,771,354 A | 6/1998 | Crawford | |
| 5,802,357 A * | 9/1998 | Li et al. | 1/1 |
| 5,809,145 A | 9/1998 | Slik et al. | |
| 5,857,180 A * | 1/1999 | Hallmark et al. | 1/1 |
| 5,860,132 A | 1/1999 | Carter et al. | |
| 5,861,883 A | 1/1999 | Cuomo et al. | |
| 5,887,274 A * | 3/1999 | Barry et al. | 1/1 |
| 5,897,638 A * | 4/1999 | Lasser et al. | 1/1 |
| 5,901,228 A | 5/1999 | Crawford | |
| 5,940,823 A | 8/1999 | Schreiber et al. | |
| 5,956,490 A | 9/1999 | Buchholz et al. | |
| 5,987,506 A | 11/1999 | Carter et al. | |
| 5,991,414 A | 11/1999 | Garay et al. | |

(Continued)

FOREIGN PATENT DOCUMENTS

| | | |
|---|---|---|
| JP | 2000194600 A | 7/2000 |
| JP | 2003186726 A | 7/2003 |
| JP | 2005025419 A | 1/2005 |

OTHER PUBLICATIONS

Shamir, "How to Share a Secret," Communications of the ACM, Nov. 1979, pp. 612-613, vol. 22, No. 11, U.S.A.

(Continued)

*Primary Examiner* — Eliyah S Harper
(74) *Attorney, Agent, or Firm* — Senniger Powers LLP

(57) ABSTRACT

Storing and/or virtually compressing a file on a virtual file system associated with a portable media drive. The virtual file system includes the portable media drive and allocated storage of a storage server. The file partitioned into a local portion and at least one remote portion. The local portion is stored on the portable media drive and the remote portions are transferred to the storage server. For a virtually compressed file, the storage size of the file on the virtual file system is calculated as a function of the storage size of the local portion on the portable media drive.

11 Claims, 5 Drawing Sheets

(56) References Cited

U.S. PATENT DOCUMENTS

| | | | |
|---|---|---|---|
| 5,999,622 A | 12/1999 | Yasukawa et al. | |
| 6,003,030 A | 12/1999 | Kenner et al. | |
| 6,014,651 A | 1/2000 | Crawford | |
| 6,035,325 A | 3/2000 | Potts, Jr. | |
| 6,088,454 A | 7/2000 | Nagashima et al. | |
| 6,128,627 A | 10/2000 | Mattis et al. | |
| 6,182,214 B1 | 1/2001 | Hardjono | |
| 6,185,655 B1 | 2/2001 | Peping | |
| 6,192,472 B1 | 2/2001 | Garay et al. | |
| 6,201,964 B1* | 3/2001 | Tung et al. | 455/432.1 |
| 6,275,939 B1 | 8/2001 | Garrison | |
| 6,327,579 B1 | 12/2001 | Crawford | |
| 6,351,776 B1 | 2/2002 | O'Brien et al. | |
| 6,351,810 B2 | 2/2002 | Gupta | |
| 6,356,863 B1 | 3/2002 | Sayle | |
| 6,363,417 B1 | 3/2002 | Howard et al. | |
| 6,363,481 B1 | 3/2002 | Hardjono | |
| 6,405,278 B1 | 6/2002 | Liepe | |
| 6,411,943 B1 | 6/2002 | Crawford | |
| 6,427,149 B1 | 7/2002 | Rodriguez et al. | |
| 6,473,860 B1 | 10/2002 | Chan | |
| 6,480,963 B1 | 11/2002 | Tachibana et al. | |
| 6,587,949 B1 | 7/2003 | Steinberg | |
| 6,687,687 B1* | 2/2004 | Smadja | 1/1 |
| 6,711,594 B2 | 3/2004 | Yano et al. | |
| 6,748,084 B1 | 6/2004 | Gau et al. | |
| 6,754,696 B1 | 6/2004 | Kamath et al. | |
| 6,766,167 B2* | 7/2004 | Tung et al. | 455/432.1 |
| 6,772,302 B1 | 8/2004 | Thompson | |
| 6,782,418 B1 | 8/2004 | Cerrone et al. | |
| 6,804,702 B2 | 10/2004 | Duroj | |
| 6,804,719 B1 | 10/2004 | Cabrera et al. | |
| 6,810,122 B1 | 10/2004 | Miyazaki et al. | |
| 6,816,941 B1 | 11/2004 | Carlson et al. | |
| 6,931,542 B1 | 8/2005 | Gregoire | |
| 6,931,549 B1 | 8/2005 | Ananda | |
| 6,957,221 B1* | 10/2005 | Hart et al. | 1/1 |
| 6,976,073 B2 | 12/2005 | Desoli et al. | |
| 6,985,927 B2 | 1/2006 | O'Brien et al. | |
| 7,010,650 B2 | 3/2006 | Kawamura et al. | |
| 7,024,431 B1* | 4/2006 | Kornelson et al. | 1/1 |
| 7,058,014 B2 | 6/2006 | Sim | |
| 7,080,051 B1 | 7/2006 | Crawford | |
| 7,111,138 B2 | 9/2006 | Higaki et al. | |
| 7,113,945 B1 | 9/2006 | Moreshet et al. | |
| 7,124,152 B2 | 10/2006 | Fish | |
| 7,136,801 B2 | 11/2006 | Leonhardt et al. | |
| 7,136,981 B2 | 11/2006 | Burch, Jr. et al. | |
| 7,139,809 B2 | 11/2006 | Husain et al. | |
| 7,165,095 B2 | 1/2007 | Sim | |
| 7,171,453 B2 | 1/2007 | Iwami | |
| 7,177,270 B2* | 2/2007 | Sim et al. | 370/229 |
| 7,287,068 B1 | 10/2007 | Eriksson et al. | |
| 7,325,041 B2 | 1/2008 | Hara et al. | |
| 7,340,492 B2 | 3/2008 | Cabrera et al. | |
| 7,380,082 B2 | 5/2008 | Meiri et al. | |
| 7,415,608 B2 | 8/2008 | Bolosky et al. | |
| 7,480,761 B2 | 1/2009 | Birrell et al. | |
| 7,630,986 B1* | 12/2009 | Herz et al. | 1/1 |
| 7,640,363 B2* | 12/2009 | Teodosiu et al. | 709/247 |
| 2001/0001761 A1* | 5/2001 | Tung et al. | 455/432 |
| 2002/0138504 A1* | 9/2002 | Yano et al. | 707/204 |
| 2004/0148571 A1 | 7/2004 | Lue | |
| 2004/0199779 A1 | 10/2004 | Huang | |
| 2005/0060316 A1 | 3/2005 | Kamath et al. | |
| 2005/0091461 A1* | 4/2005 | Kisley et al. | 711/162 |
| 2005/0102325 A1* | 5/2005 | Gould et al. | 707/104.1 |
| 2005/0108263 A1 | 5/2005 | Cabrera et al. | |
| 2005/0114368 A1* | 5/2005 | Gould et al. | 707/100 |
| 2005/0114369 A1* | 5/2005 | Gould et al. | 707/100 |
| 2005/0240749 A1 | 10/2005 | Clemo et al. | |
| 2006/0078127 A1 | 4/2006 | Cacayorin | |
| 2006/0136368 A1* | 6/2006 | Young-Lai et al. | 707/2 |
| 2006/0206889 A1 | 9/2006 | Ganesan et al. | |
| 2007/0143277 A1 | 6/2007 | Van De Laar et al. | |
| 2008/0109437 A1* | 5/2008 | Perrizo et al. | 707/7 |
| 2008/0126357 A1 | 5/2008 | Casanova et al. | |
| 2008/0126705 A1 | 5/2008 | Jogand-Coulomb et al. | |
| 2008/0256147 A1 | 10/2008 | Anand et al. | |
| 2008/0301775 A1 | 12/2008 | Ollikainen et al. | |
| 2009/0019223 A1 | 1/2009 | Lection et al. | |
| 2009/0070344 A1 | 3/2009 | Espelien | |
| 2009/0132676 A1 | 5/2009 | Tu et al. | |

OTHER PUBLICATIONS

Rabin, "Efficient Dispersal of Information for Security, Load Balancing, and Fault Tolerance," Journal of ACM, Apr. 1989, pp. 335-348, vol. 36, No. 2, USA.

Unknown, "Java Web Start Overview," Technical White Paper, May 2005, 14 pages, Sun Microsystems, USA.

Unknown, "A 5-Step Guide to Protecting Backup Data," 2005, 17 pages, Iron Mountain, USA.

Chance, "Understanding USB Flash Drives as Portable Infrastructure," 2005, 6 pages, Browsercraft, LLC., USA.

Unknown, "Executive's Guide: Best Practices for Offsite Data Protection and Recovery," 2006, 10 pages, Iron Mountain, USA.

Unknown, "Highly Secure, Highly Reliable, Open Source Storage Solution," Technical Whitepaper, Jun. 2006, 13 pages, Cleversafe, LLC., USA.

Sun et al., "An Efficient Construction of Perfect Secret Sharing Schemes for Graph-Based Access Structures," Computers and Mathematics with Applications, vol. 31, No. 7, 1996, pp. 129-135, Elsevier Science Ltd., UK.

Unknown, Personal Portable Security Devices, Tech & Trends, vol. 31, Issue 16, Jun. 5, 2009, Sandhills Publishing Company, US, 3 pages.

Dreger, Richard et al., Smartphone Security: It's Your Call, InformationWeekanalytics.com, Jun. 1, 2009, 18 pages.

Sever, Gil, Safeguarding removable-media devices, Network World, www.networkworld.com, Jan. 12, 2009, 1 page.

Phifer, Lisa, Diverse mobile devices changing security paradigm, Information Security Magazine, Nov. 2008, 6 pages.

Wolfe, Alexander, Is the Smartphone the New Laptop?, Information Week Research & Reports, Oct. 10, 2008, 12 pages.

Unknown, Mobile device security is a concern, Communication News, Enterprise Network Solutions, Trends Jul. 2008, 4 pages.

Wong, Sam, Risk Associated With USB Memory Sticks and High Capacity Storage Devices, Siemens Insight Consulting, www.siemens.co.uk/insight, 4 pages.

US 7,155,513, 12/2006, Arakawa et al. (withdrawn).

\* cited by examiner

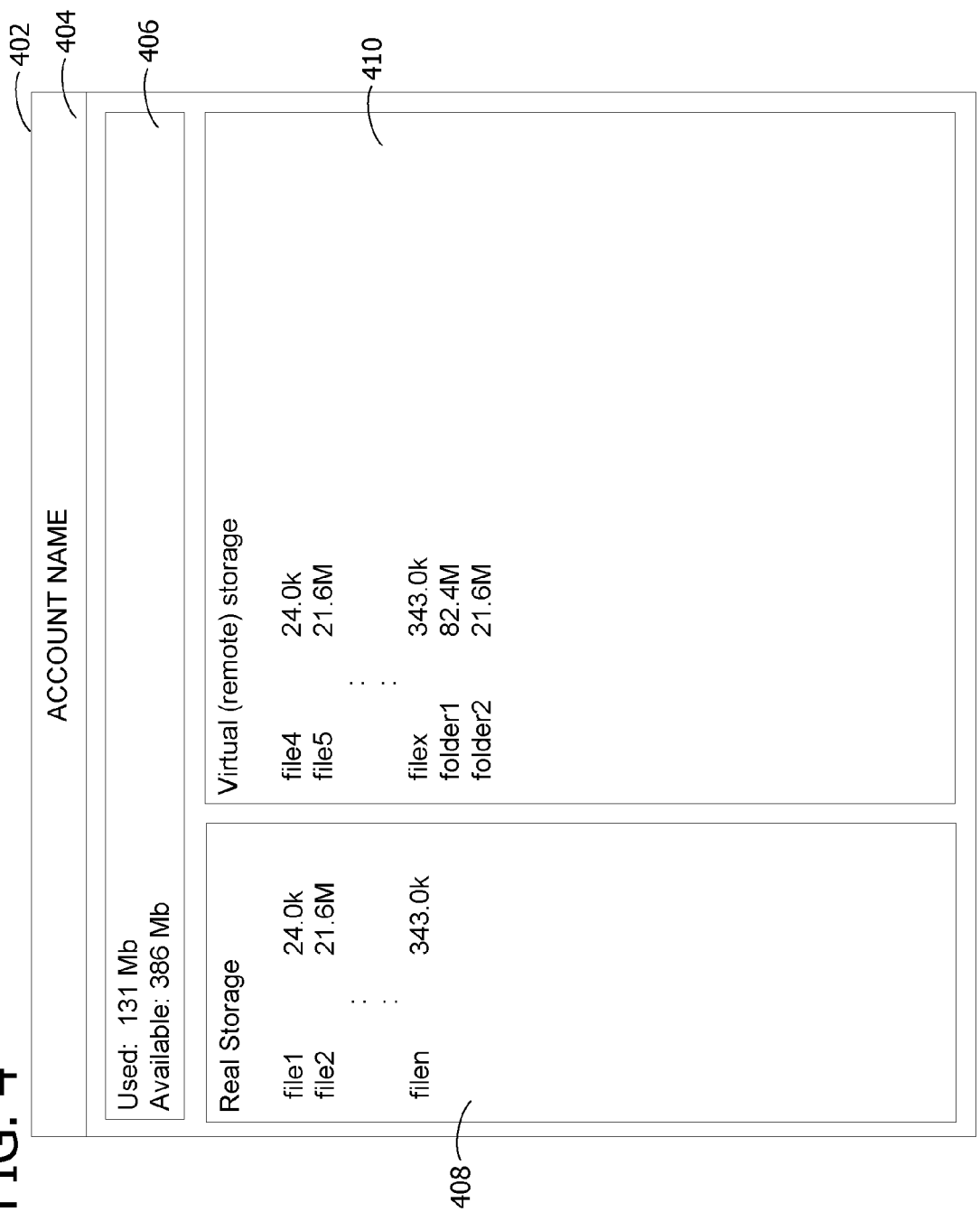

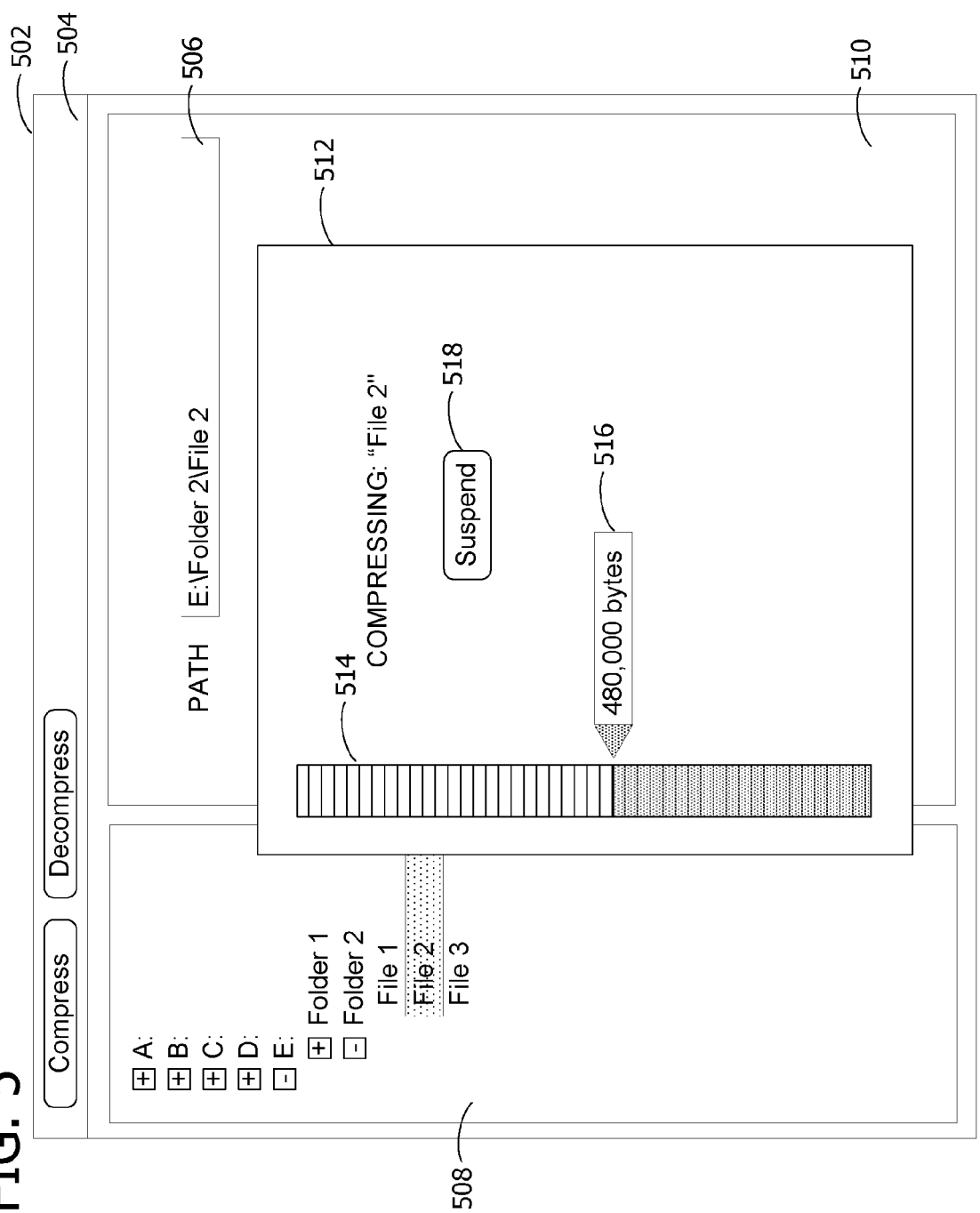

VIRTUAL STORAGE OF PORTABLE MEDIA FILES

BACKGROUND

Portable media technology has steadily improved for many years. One highly recognized form is that of the floppy disk. More recently, the use of floppy disks has been overtaken by USB (Universal Serial Bus) Flash technology. Portable media drives employing flash technology make available a wide range of storage capacities, each in a compact physical form that users find immensely convenient. However, a given portable media drive possesses a limited and inflexible capacity. Reaching the full capacity of the portable media drive compels the user to delete other files, or to acquire additional drive space.

Furthermore, the loss or theft of the portable media drive presents the user with a painful consequence of its compact form. And, while the portable media drive itself is generally quite reliable, files can be lost or compromised due to the failure of the portable media drive. In some cases, the files stored on the portable media drive can be replaced, but the loss or theft of the drive poses a serious threat to personal privacy and to corporate security. Furthermore, the user may not become immediately aware that files stored on the portable media drive had been lost or compromised.

For example, suppose a business person is preparing to travel to another city to deliver an important presentation to a potential customer. Important files cannot always be sent ahead via email or disk because there may be no appropriate contact person to receive them or the presentation may require critical last minutes updates. Moreover, transferring files electronically may not be possible because the needed network resources at the customer site are not accessible to the business person. Furthermore, the business person may not wish to transfer copies of sensitive information (e.g. pricing or product details) to the potential customer before the presentation. In these cases, storing the presentation files on portable media drive makes them easily transported and also permits them to be accessed and modified. Unfortunately, the business person risks losing or compromising the files because of the risks inherent in the use of a conventional portable media drive.

SUMMARY

Embodiments of the invention overcome one or more disadvantages of conventional portable storage by creating a virtual file system and facilitate the virtual compression of a file. Aspects of the invention include storing a file on a virtual file system associated with a portable media drive. The virtual file system includes the portable media drive and allocated storage of a storage server. By partitioning the file into at least one local portion and at least one remote portion, aspects of the invention provide improved security. The local portion is stored on the portable media drive and the remote portions are transferred to the storage server.

Aspects of the invention also include compressing a file associated with a virtual file system associated with a portable media drive. The file is partitioned into a local portion and at least one remote portion. The local portion is stored on the portable media drive and the remote portions are transferred to the storage server. The storage size of the file on the virtual file system is calculated as a function of the storage size of the local portion of the file stored on the portable media drive. As such, aspects of the invention improve storage capacity.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 4 is a block diagram illustrating an exemplary user interface for a virtual file system.

FIG. 5 is a block diagram illustrating an exemplary user interface for a virtual file compression program.

Corresponding reference characters indicate corresponding parts throughout the drawings.

DETAILED DESCRIPTION

Figure 1:
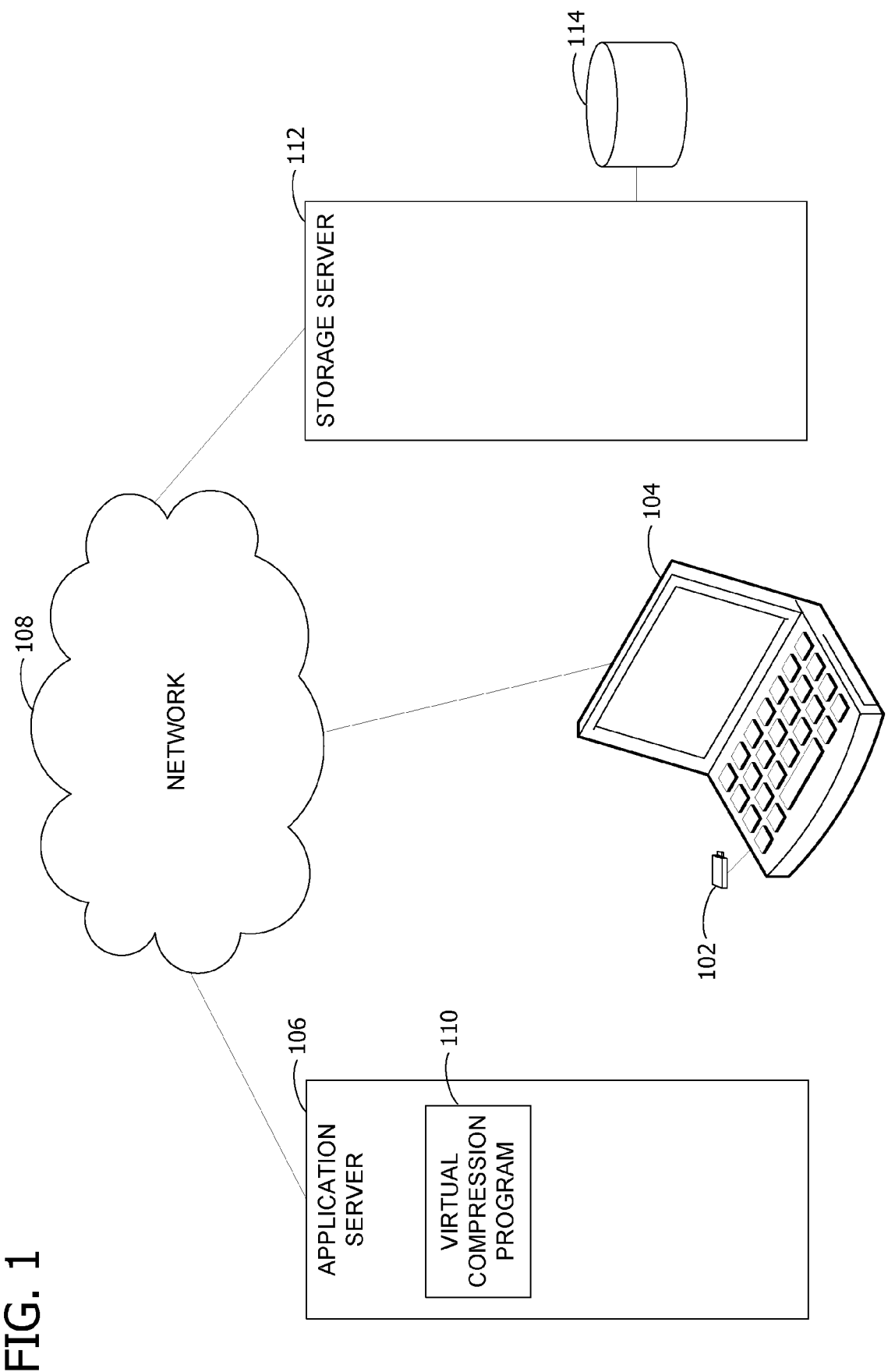
FIG. 1 is a block diagram illustrating one example of a suitable computing system environment in which aspects of the invention may be implemented.

Referring now to the drawings, an embodiment of the invention includes a virtual file system and the virtual compression of a file. In FIG. 1, a portable media drive 102 (e.g. Universal Serial Bus (USB) drive) connects to a computer 104. The portable media drive 102 illustrated in FIG. 1 is shown as a USB drive for convenience only. The portable media drive 102 includes CompactFlash card, Memory Stick, MicroSD, MiniSD, MultiMediaCard (MMC), Pen Drives, high-speed MMC, reduced-size MMC, Secure Digital (SD), xD-Picture Card, floppy disk, read/write CD-ROM, read/write DVD-ROM and ZIP disks or any other portable media drive 102 capable of connecting to the computer 104.

FIG. 1 shows one example of a general purpose computing device in the form of a computer 104. In one embodiment of the invention, a computer such as the computer 104 is suitable for use in the other figures illustrated and described herein. Computer 104 has one or more processors or processing units and a system memory. The computer 104 typically has at least some form of computer readable media. Computer readable media, which include both volatile and nonvolatile media, removable and non-removable media, may be any available medium that may be accessed by computer 104. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 104. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The computer 104 connects to an application server 106 through a network 108 connection. In one embodiment, the network is a global communication network such as the Internet. The computer 104 may operate in a networked environment using logical connections to one or more remote computers, such as an application server 106. The logical connections depicted in FIG. 1 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

In FIG. 1, the application server 106 hosts a virtual compression program 110, which allows a user to modify files associated with the portable media drive 102. In an embodiment, the virtual compression program 110 is launched after the computer 104 connects to the application server 106. The application server 106 has access to a storage server 112 having one or more remote storage devices 114. In one embodiment, the application server 106 and the storage server 112 are the same server. In an alternative embodiment, the application server 106 has access to the storage server 112 through the network 108. The remote storage device 114 contains one or more portions of files associated with the portable media drive 102.

In an embodiment, the portable media drive 102 is a commercial off-the-shelf type USB Flash drive that has been prepared for use with the system. The portable media drive 102 may be distinguished from other portable media drives by creating a partition on the portable media drive 102 that is not visible to ordinary operating systems. Data required for the virtual compression is then written to the sectors within that partition. Alternatively, alterations are made to the hardware interface of the portable media drive 102 to configure the portable media drive for use with the system. As a third alternative, special purpose portable media drives 102 are manufactured such that the system will recognize them.

The virtual compression program 110 can be built from various technologies, and is initially deployed from the application server 106 to the computer 104. For example, an executable version of the virtual compression program 110 can be first downloaded to the portable media drive 102, and then used to perform the process in conjunction with additional browser-based elements. Alternatively, needed files can be stored on the portable media drive 102. In an embodiment, the virtual compression program 110 is implemented using smart client technology. Smart client technology generally refers to applications which are delivered over the web, do not require installation on a client computer, automatically update without user action and have the look and feel of desktop applications.

Designed in this way, an instance of the virtual compression program 110 will be deployed by the application server 106, but launched and executed within the controlled environment of the computer 104. Advantageously, this allows the virtual compression program 110 to gain access to the local drives of the computer 104, unlike a strictly browser-based application. Additionally, since the virtual compression program 110 executes locally on the computer 104, the file being compressed is protected from direct exposure to the Internet. Consequently, malicious interception of virtual compression program 110 outputs will not result in the compromise of file content. As a third advantage, because the virtual compression program 110 executes locally, demands on the application server 106 resources are limited.

Although described in connection with an exemplary computing system environment, including computer 104, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules (e.g. virtual compression program 110), executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

Figure 2:
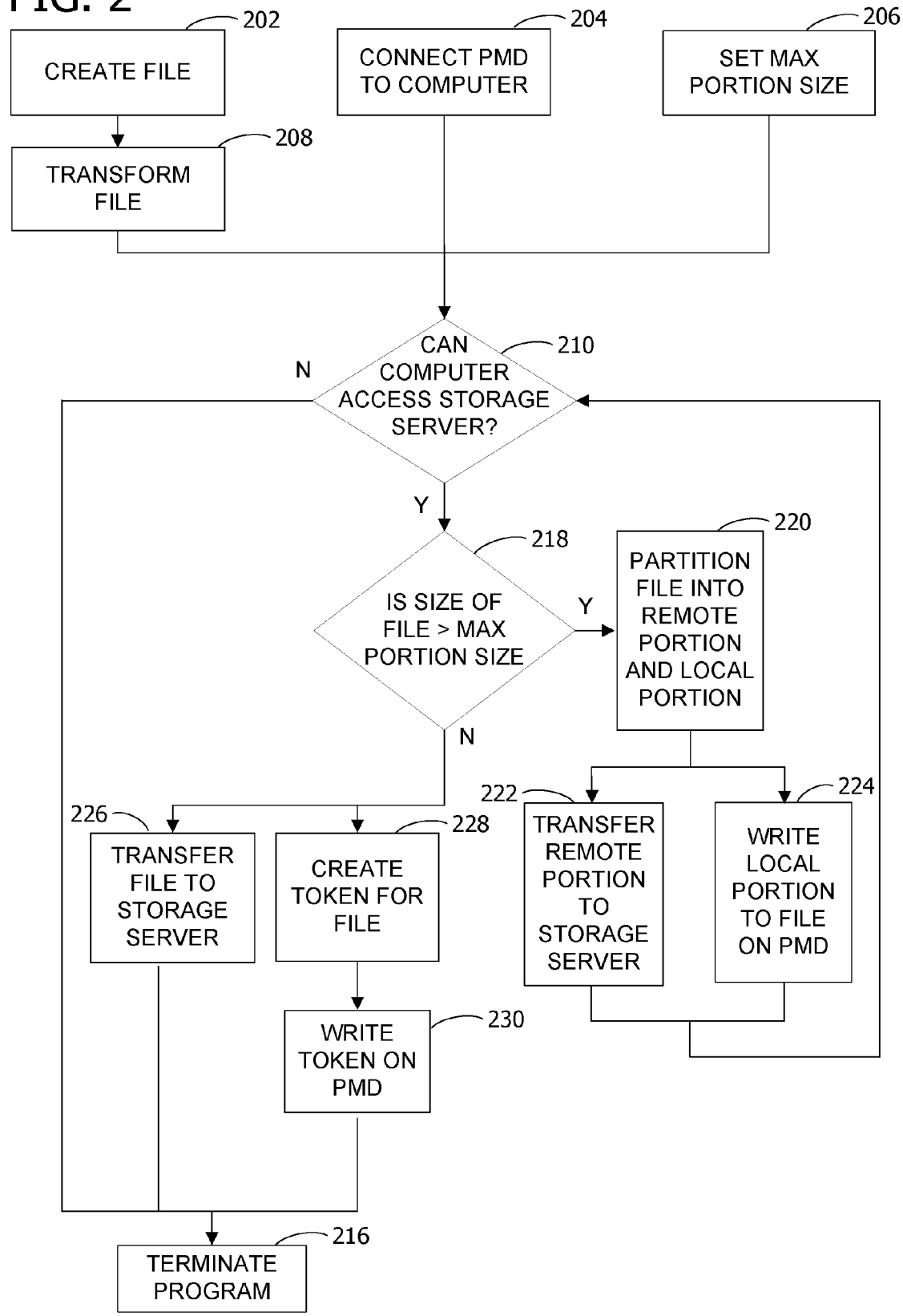
FIG. 2 is an exemplary flow diagram illustrating operation of a virtual compression program.

FIG. 2 is a flow diagram for a method of virtually compressing a file according to an embodiment of the invention. At 202, a file is created and at 204, the portable media drive (PMD) 102 is connected to the computer 104. At 206, a maximum portion size is determined. For example, the maximum portion size may be equal to the size of a packet.

At 208, the file is transformed. In an embodiment, transforming includes at least one of the following: compressing the file and reorganizing the file. For example, real data compression consists of first applying a block-sorting algorithm such as the Burrows-Wheeler Transform, followed by entropy encoding, such as Huffman Coding. The block-sorting algorithm does not perform compression by itself, but enhances the entropy encoding that follows. The exact operations used to perform real data compression will depend on the type and size of file selected.

Reorganization includes bit-wise reorganization not aligned with the byte boundaries in the source file, nibble-wise reorganization and byte-wise reorganization. For example, nibble-wise reorganization separates the upper nibbles from the lower nibbles of the hexadecimal equivalent of each byte and groups are moved to different regions of the file producing a transformation. In another example, byte-wise reorganization consists of shuffling bytes of nibble-wise reorganization, resulting in newly adjacent relationships not resembling those of the original data. In a third example, bit-wise reorganization separates the file into n-bit groups and the groups are moved to different regions of the file producing a transformation. In an alternative, the n-bit group is not aligned with the bytes boundaries of the file (i.e., 3-bit or 10-bit groups). The exact operations used to perform reorganization will depend on the type and size of file selected. After the file has been transformed and reorganized, the data of the file is noncontiguous (i.e., the data is no longer in the sequence of the original file).

At 210, a check is made that the computer 104 can access the remote storage device 114 of the storage server 112. If the computer 104 cannot access the remote storage device 114 of the storage server 112, the program terminates at 216.

If the computer 104 can access the remote storage device 114 of the storage server 112, at 218, it is determined if the size of the file is greater than the maximum portion size that was determined at step 206. If the file size is greater than the maximum portion size, at 220 the file is partitioned into a remote portion having a maximum portion size and a local portion including the remaining data of the file. In an embodiment, the data of the remote and local portions are not overlapping, such that the remote portion and the local portion include one copy of the original file data. Additionally, because the original source file is transformed at 208, each portion (local and remote) contains noncontiguous, scattered data from the original source file.

At 222, the remote portion is transferred to the storage server 112 and, at 224, the local portion is copied to the portable media drive 102. Advantageously because the file has been transformed before partitioning, the file cannot be readily accessed and compromised from any local portion of the file if the portable media drive 102 is lost or stolen. The remote portions are treated as individual files after being transferred to the storage server 112. The contiguous dependency of the portions of a file transformation is determinable only by the process, and only after all the portions has been reacquired on a client machine. For example, consider three remote portions instances, each containing one portion of the file. Distinguishing storage instances according to a hash value of the corresponding portion body, respectively, allow database systems that do not distinguish portions according to origin.

Therefore, substantially indeterminate storage results when a user suspends a transferal at certain intermediate intervals. Additionally, it is unnecessary for a given instance of remotely allocated storage to be confined to a single location. Alternatively, portions of a given file may be transferred to any one of a plurality of storage servers.

The process continues on at 210, checking to see if the computer 104 can still access the storage server 112. If so the process continues on partitioning the file, overwriting the local portion to the portable media drive 102 and transferring the remote portion to the storage server 112, until, at 218, it is determined that the file size is less than the maximum portion size or the process can no longer access the storage server 112 at 210. Alternatively, the process continues on until the user signals it to suspend. In this manner, each of the steps 210-224 reduces the size of the local portion of the file on the portable media drive 102 while increasing the number portions transferred to the storage server 112. The storage size of the file on the virtual file system is approximately equal to a storage size of the local portion on the portable media drive 102. To reassemble the file, the portions written to the storage server 112 are retrieved and combined with the local portion, if any, remaining on the portable media drive 102.

If it was determined at 218 that the file size is less than the maximum portion size, at 226 the file is transferred to the storage server 112. At 228, a token or identifier is created for the file and, at 230, the token or identifier is written to the portable media drive 102. The storage size of the file on the virtual file system is approximately equal to zero. In an embodiment, the token is hidden on the portable media drive 102. Alternatively, the user may email the token to his or herself. In yet another alternative, a copy of token is saved on the computer 104. By doing so, the user is afforded the option to return to the computer 104 in the event their portable media drive 102 is no longer accessible (e.g. lost, stolen, damaged or corrupt). The program then terminates at 216.

Figure 3:
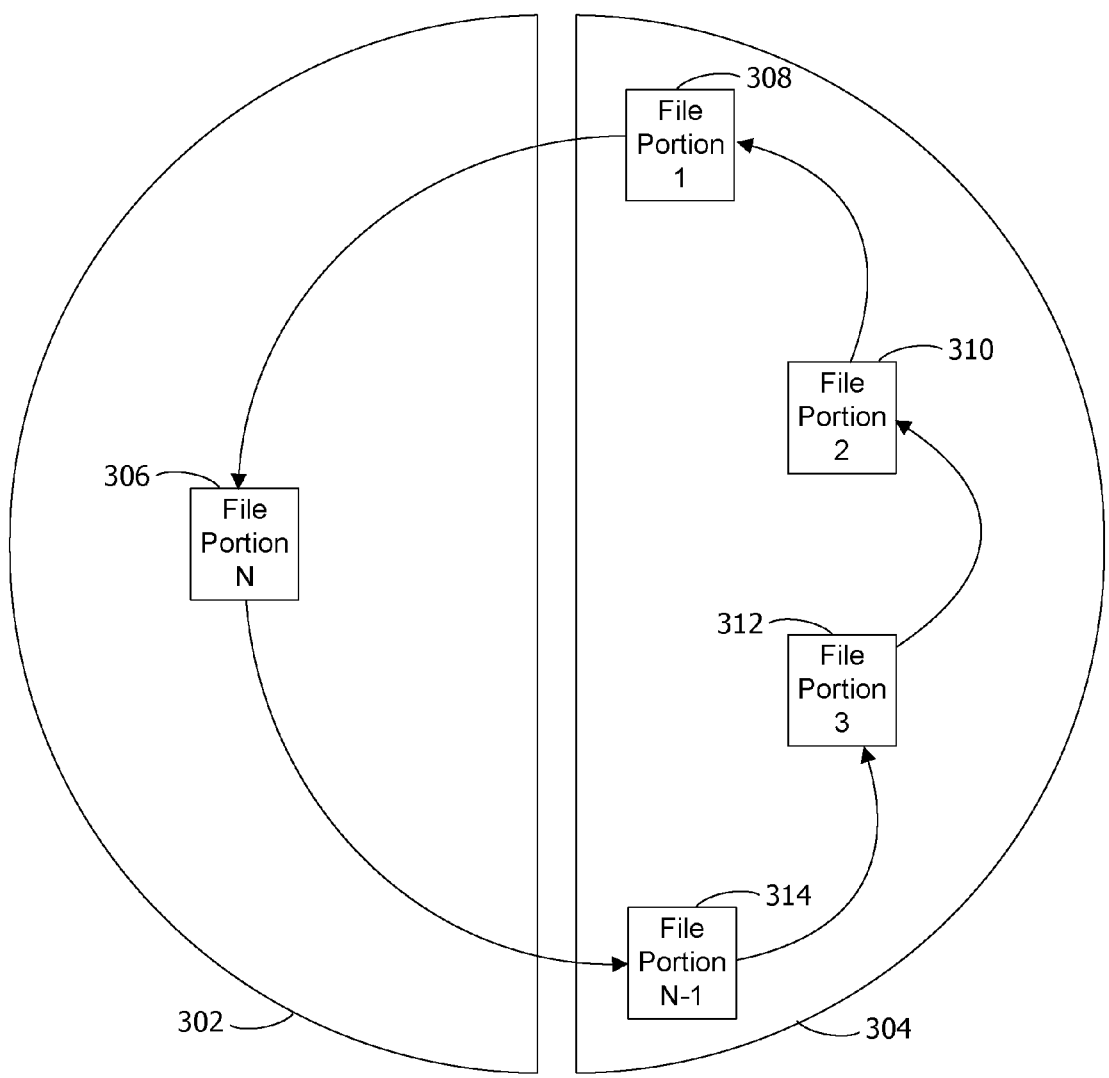
FIG. 3 is a block diagram illustrating local and remote storage of a virtual file system according to an embodiment of the invention.

In FIG. 3, the two realms of virtual space are illustrated, local 302 (e.g. portable media drive 102) and remote 304 (e.g. remote storage device 114). In this example, the file consists of N portions, one local portion 306 and N−1 remote portions 308, 310, 312, 314. A physical separation exists between the local 302 and remote 304, yet each of the portions are contiguously dependent as shown by lines of dependency connecting the portions 306, 308, 310, 312, 314. The Nth portion, i.e., local portion 306 remains in local storage, and accounts for the total apparent size of the file on the portable media drive 102. Portions of the file are necessarily made contiguously dependent for purposes of file retrieval. A second portion contains the identity of the successive portion, and so forth. For example, the first portion 306 contains the identity of the successive (N−1) portion 314 and portion-3 312 contains the identity of successive portion-2 310 and so forth.

Only when the portions are brought together can the file be recovered in its original state. The identity of the successive portion can be expressed any way as long the identify can be definitively determined. For example, the identity may be expressed as a pointer, physical address, logical address, database location, file name, or some function of the identity (e.g. such as a hash of the physical location).

FIG. 4 illustrates an embodiment of a graphical user interface 402 of the virtual compression program 110. Following authentication of the portable media drive 102, an account title bar 404 corresponding to the portable media drive 102 is displayed to the user. In one embodiment, the graphical user interface 402 appears automatically in response to the portable media drive 102 being connected to the computer 104.

The graphical user interface 402 displays virtual space 406, showing both used and available space. The left panel 408 lists files stored locally on the portable media drive 102. The right panel 410 lists files stored in the virtual space that exists across both local the portable media drive 102 and the remote storage device 114. In this manner, a virtual space is created and the files of the virtual space are only accessible on the portable media drive 102 via the virtual compression program 110. In one embodiment, the virtual space is much larger than the capacity of the portable media drive 102.

Alternatively, FIG. 5 illustrates an embodiment of a graphical user interface 502 of the virtual compression program 110 where the files of the portable media drive 102 may be virtually compressed and decompressed. The graphical user interface 502 displays a toolbar 504 offering the user access to the virtual compression program 110 functionality. Following authentication of the portable media drive 102, a directory tree of drives accessible to the virtual compression program 110 are displayed in the left panel 508. The drive letter corresponding to the portable media drive 102 (e.g., E:) appears among the disc drives. Files and folders may be selected and highlighted (e.g., File 2). Details pertaining to the selection displays in the right panel 510. For example, the path of the selected file 506 is displayed.

Once the virtual compression or decompression option is selected from the toolbar 504, a progress window 512 is displayed. Within the progress window 512, a vertical progress bar 514 or some other form of graphical representation displays the proportional relationship between local storage (e.g. the portable media drive 102) and remote storage (e.g. remote storage device 114) for the selected file. In one embodiment, during virtual compression a solid pointer indicates the local storage occupied by the file is diminishing and an open pointer is indicates the local storage occupied by the file is increasing. The actual amount of local storage on the portable media drive 102 is displayed in a size box 516. The suspend button 518 allows the user to suspend either virtual compression or virtual decompression at any point during the process, accepting the partial results. The process can be resumed at another location and/or at another time. The process can also be reversed at will. This flexibility permits a user to adjust as needed, the local storage occupied by a given file.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method of storing files in a virtual file system comprising:
    executing locally, via a client computer, an instance of a program;
    accessing, via the client computer, an original source file via the instance of the program, said client computer being coupled to a remote storage server via a data communication network, said storage server having allocated storage associated with the portable media device;
    sequentially partitioning the original source file into a plurality of portions, each of said plurality of portions comprising a subset of the original source file, each said subset comprising a unique, non-overlapping portion of the original source file, said partitioning the original source file including one or more of the following: real compression of the file; executing a block-sorting algorithm on the file; entropy encoding the file; and reorganizing the file, said reorganizing the file including one or more of the following: bit-wise reorganizing, nibble-wise reorganizing and byte-wise reorganizing, wherein the plurality of portions are combined to reassemble the original source file, comprising:
        initially partitioning the source file into a plurality of unique, non-overlapping portions of the original source file, said unique, non-overlapping portions of the original source file comprising at least a first remote portion and a first remainder portion, said partitioning comprising creating, within the first remainder portion, a unique identifier referencing the first remote portion;
        initially storing the first remote portion in the allocated storage on the remote storage server;
        initially storing the first remainder portion on the portable media drive;
        subsequently partitioning the first remainder portion into a plurality of unique, non-overlapping portions of the first remainder portion, said unique, non-overlapping portions of the first remainder portion comprising at least a second remote portion and a resulting remainder portion, said partitioning comprising creating, within the resulting remainder portion, a unique identifier referencing the second remote portion;
        subsequently storing the second remote portion in the allocated storage on the remote storage server; and
        subsequently storing the resulting remainder portion on the portable media drive, said storing the resulting remainder portion comprising overwriting the first remainder portion on the portable media drive with the resulting remainder portion; and
    in determining the resulting remainder portion is greater than a predetermined maximum portion size, repeating said subsequently partitioning and subsequently storing as noted above of the resulting remainder portion and of any other resulting remainder portions until a last resulting remainder portion is smaller than the maximum portion size; and
    storing the last resulting remainder portion as a local portion on the portable media drive,
    wherein a storage size of the original source file in the virtual file system is approximately equal to a storage size of the local portion on the portable media drive and wherein the original source file is reassembled by retrieving the remote portions stored on the remote storage server and sequentially combining the retrieved remote portions with the local portion on the portable media device as a function of all unique identifiers.

2. The method of claim 1, wherein partitioning the source file comprises transforming the source file such that data of the portions are noncontiguous.

3. The method of claim 1, further comprising creating an identifier on the portable media drive, said identifier referencing the one or more remote portions of the source file in the allocated storage of storage server.

4. The method of claim 1, wherein each of the one or more remote portions of the source file stored in the allocated storage of the storage server is stored as a separate discrete unit.

5. The method of claim 1, wherein each of the portions of the source file is a packet.

6. The method of claim 1, wherein the remote portions of the source file are of unequal size.

7. The method of claim 1, wherein the local portion and each of the one or more remote portions of the file are of equal size.

8. The method of claim 1, wherein one or more computer-readable media have computer-executable instructions for performing the method recited in claim 1.

9. A method for compressing a file associated with a virtual file system associated with a portable media drive, said virtual file system including the portable media drive and allocated storage of a storage server, said portable media drive being connected to a client computer, said client computer being different than the storage server and having access to the storage server, said method comprising:

initiating the virtual file system by the receipt at the client computer of a locally executable program, wherein the client computer locally executes an instance of the program;

determining a maximum capacity of the portable media drive and a storage size of the file;

copying, in determining the determined maximum capacity is greater than the determined file size, the file to the allocated storage, said copying further comprising storing a token of the file to the portable media drive;

sequentially partitioning in determining the determined maximum capacity is less than the determined file size, the file into a plurality of portions, said portions including a first portion and a second portion, said first portion and said second portion comprising two unique, non-overlapping portions of the file, said first portion comprising a remote portion and being contiguously dependent on the second portion, said second portion comprising a remainder portion, said partitioning including one or more of the following: real compression of the file; executing a block-sorting algorithm on the file; entropy encoding the file; and reorganizing the file, said reorganizing including one or more of the following: bit-wise reorganizing, nibble-wise reorganizing and byte-wise reorganizing said partitioning further comprising:

creating within the second portion a unique identifier referencing the first portion;

Initially transferring the first portion to the allocated storage of the storage server;

subsequently partitioning the second portion into a third portion and a fourth portion, such that a file size of the fourth portion is smaller than the determined maximum capacity, said first portion, said third portion, and said fourth portion comprising three unique, non-overlapping portions of the file, said third portion comprising another remote portion and said second portion comprising a resulting remainder portion;

creating within the fourth portion a unique identifier referencing the third portion;

subsequently transferring the third portion to the allocated storage of the storage server; and subsequently storing the fourth portion on the portable media drive, wherein the storage size of the file on the virtual file system comprises the storage size of the fourth portion on the portable media drive.

10. The method of claim 9, wherein partitioning the file comprises transforming the file such that data of the portions are noncontiguous.

11. The method of claim 9, wherein the second portion does not contain data from the file and first portion contains all the data of the file; and wherein storage size of the file on the virtual file system is approximately equal to zero.

* * * * *